May 29, 1956  J. E. CADY  2,747,223
APPARATUS FOR MAKING INNER TUBES FOR TIRES
Filed Oct. 24, 1950  4 Sheets-Sheet 1
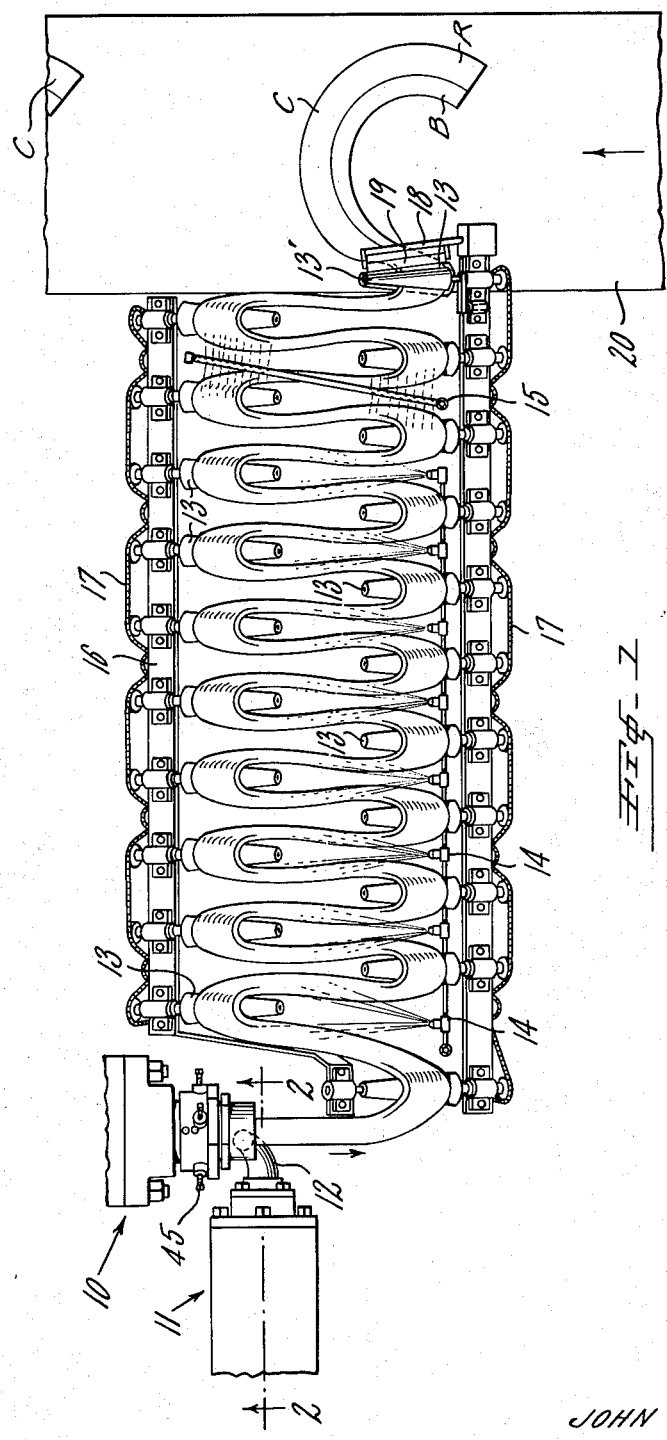
INVENTOR.
JOHN E. CADY
BY
Charles C. Willson
ATTORNEY

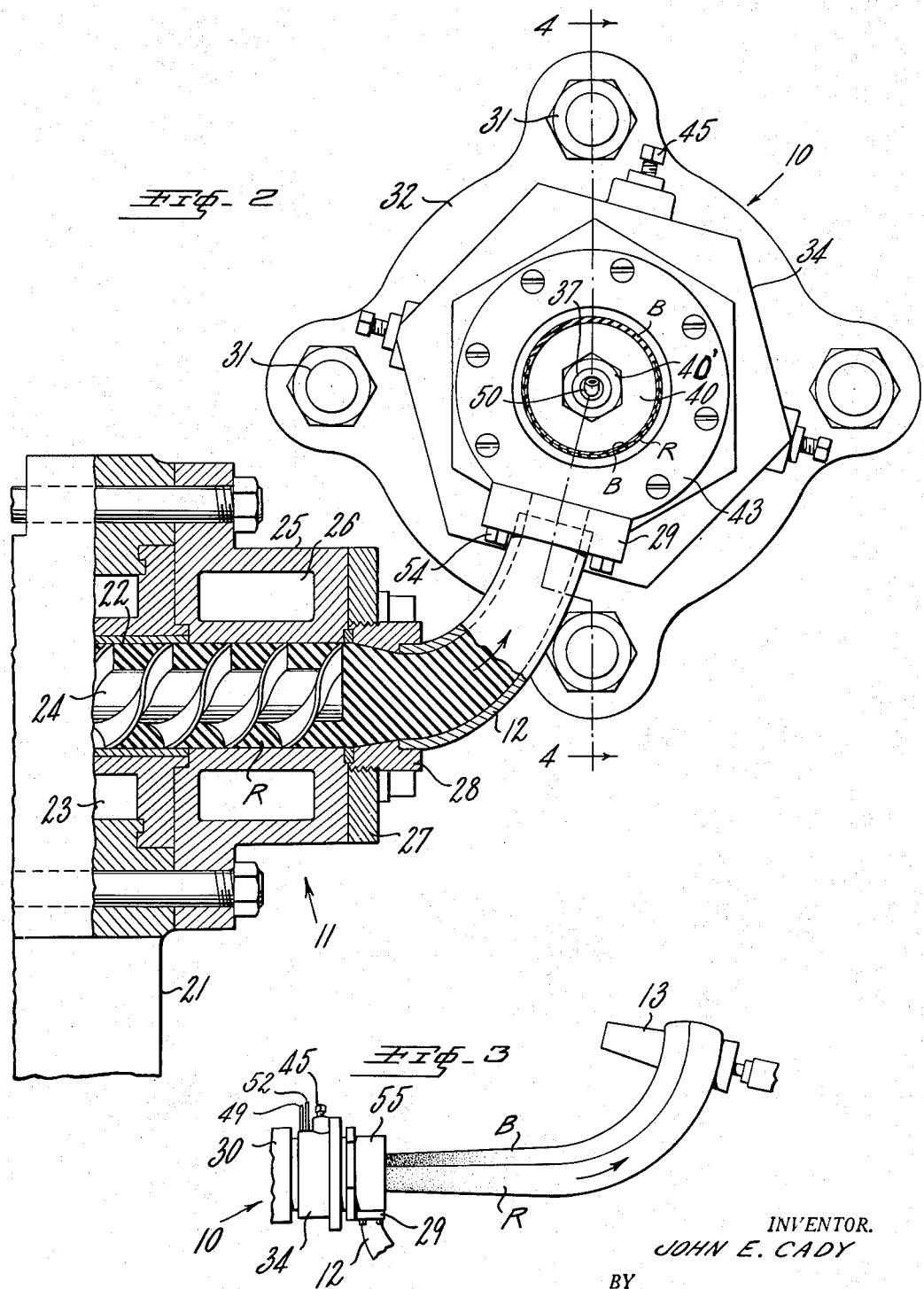

May 29, 1956 J. E. CADY 2,747,223
APPARATUS FOR MAKING INNER TUBES FOR TIRES
Filed Oct. 24, 1950 4 Sheets-Sheet 3
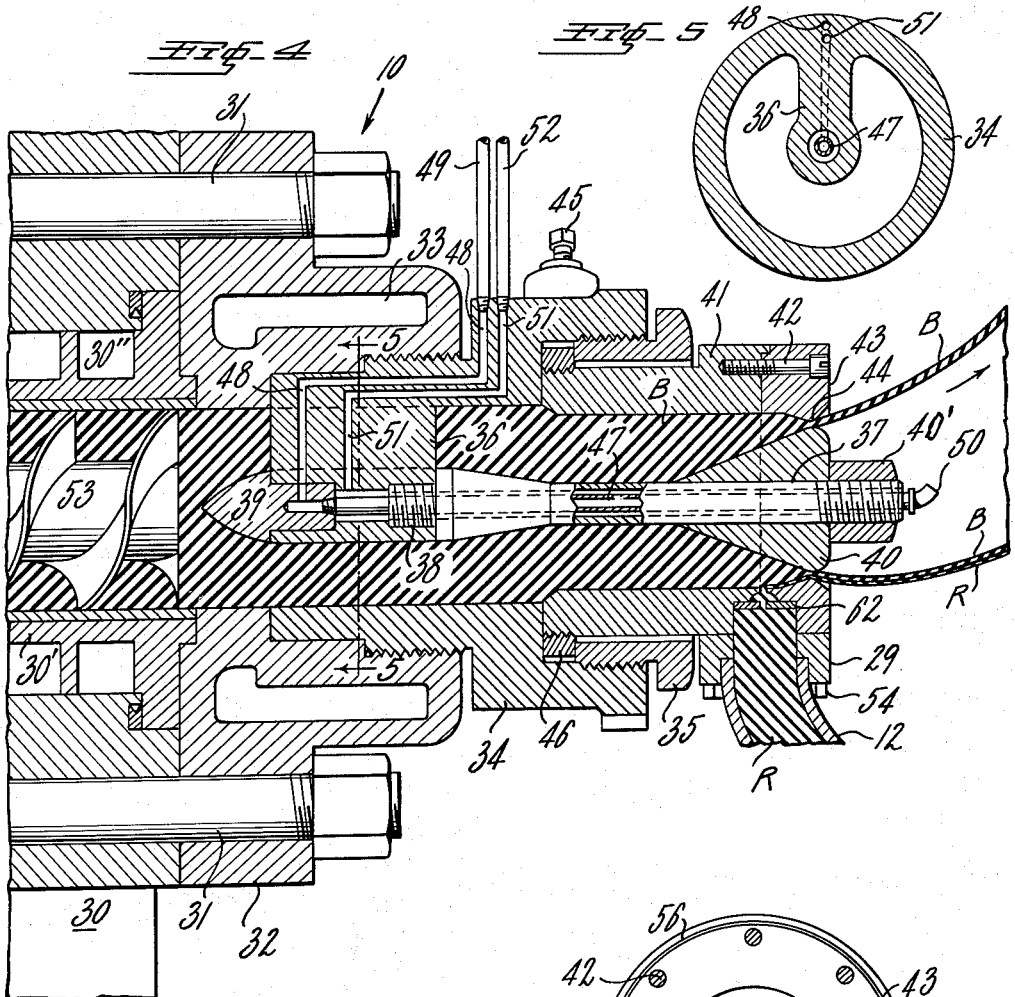
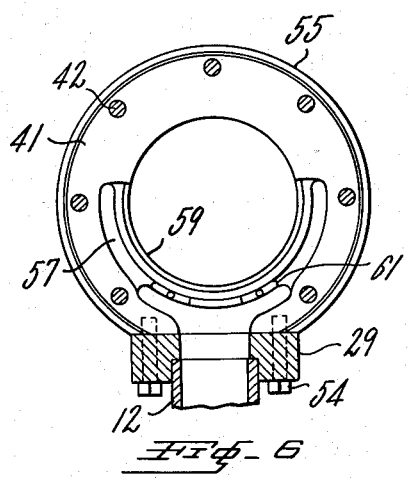
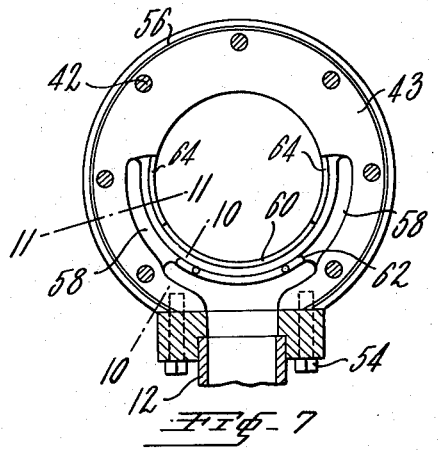
INVENTOR.
JOHN E. CADY
BY Charles C. Willson
ATTORNEY

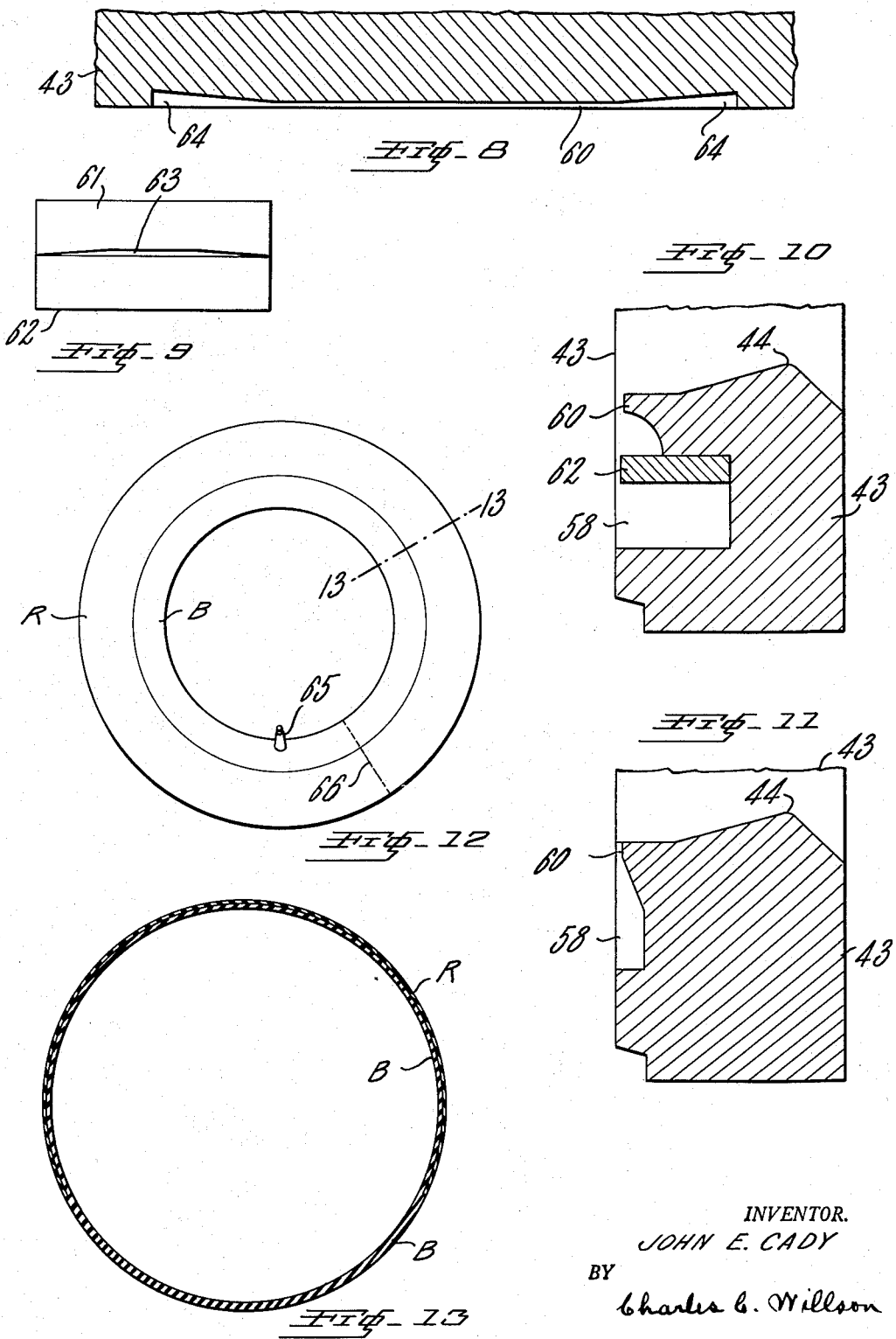

United States Patent Office 2,747,223
Patented May 29, 1956

2,747,223

APPARATUS FOR MAKING INNER TUBES FOR TIRES

John E. Cady, Indianapolis, Ind., assignor to United States Rubber Company, New York, N. Y., a corporation of New Jersey Application October 24, 1950, Serial No. 191,800

1 Claim. (Cl. 18—14)

This invention relates to apparatus for extruding in a single operation a two-color or a two-stock tube from which can be formed an inner tube having one type of rubber in one portion thereof and a different type of rubber in another portion thereof.

The extruding apparatus of the present invention is preferably used in combination with a bending machine of the type as disclosed and claimed in the Hinman Patent No. 2,423,147, for Method and Apparatus for Manufacturing Inner Tubes and is shown and described in conjunction with such a machine. The machine of this Hinman patent serves to bend the tube which is hot when extruded to an arc of the desired curvature as it leaves the extruder, and to advance the hot tube along a predetermined path so that it will retain this arcuate curvature while it is being cooled and takes a set to retain such longitudinal curvature. A C-shaped length of such curved tube can be more readily formed into an inner tube than can a straight tube, the walls of which must be distorted to a greater degree to form it into the annular shape of an inner tube. As a result an inner tube formed of a C-shaped length of tube as herein contemplated will inflate to more uniform dimensions than will an inner tube formed from a straight tube.

It is found that if the freshly extruded tube is bent to the form of an arc as it leaves the extruder, the wall at the inner curvature of such arcuate tube has a tendency to form transverse pleats or corrugations which are objectionable. This difficulty can be avoided by maintaining an above atmosphere pressure inside of the tube adjacent the extruder and by carefully controlling this pressure so as to keep the tube well inflated in the form of a round tube, without permitting the pressure to become great enough to balloon the wall of the freshly extruded rubber stock.

The stock used to form either portion of the two-tone inner tubes herein described may be formed of natural or synthetic rubber as desired.

Other objects and advantages of the apparatus of the invention will become apparent from the following description when read in connection with the accompanying drawings; wherein Fig. 1 is a top plan view of a two-stock tube extruder associated with apparatus for bending the freshly extruded tube and for advancing it along an approximately serpentine path.

Fig. 2 on a larger scale is an end view of the main tuber shown in Fig. 1, and a vertical sectional view through the secondary tuber shown in Fig. 1.

Fig. 3 is a side view showing how the two-color extruded tube passes from the main extruder along a curved path to the first conical roll of the machine for advancing the tube along an approximately serpentine path.

Fig. 4 is a vertical sectional view taken along the line 4—4 of Fig. 2.

Fig. 5 is a vertical sectional view taken on the line 5—5 of Fig. 4.

Fig. 6 is a face view of a tuber die as it appears when the tuber die ring is removed.

Fig. 7 is a view of the cooperating face of the removed tuber die ring.

Fig. 8 is a stretch-out sectional view showing the shape of the narrow slot formed in a sidewall of the main extruder to receive one color stock.

Fig. 9 is a side view of two curved baffle plates having a narrow slot provided therebetween.

Fig. 10 on a larger scale is a sectional view taken on the line 10—10 of Fig. 7.

Fig. 11 is a similar view taken on the line 11—11 of Fig. 7.

Fig. 12 is a side view of a finished two-color inner tube constructed in accordance with the present invention; and Fig. 13 is an enlarged sectional view taken on the line 13—13 of Fig. 12.

Fig. 1 of the drawing shows the front or discharge end portion of the main extruder 10 and of the secondary extruder 11. The secondary extruder is connected to the main extruder by the curved inter-connector pipe 12. The arrangement is such that the stock within the secondary extruder 11 is forced into the high pressure side of the main extruder 10 through a slot in the side wall of the main extruder and at the high pressure side of the annular extruding throat of the main extruder. The stock supplied to the main extruder issues therefrom in the form of a cylindrical tube, and this tube has applied to one face thereof in the form of a very thin outer strip the different type of stock supplied by the secondary extruder 11. This will be apparent from Fig. 1 where a tube formed by the main extruder 10 and which is usually a black rubber stock such as butyl rubber is marked B for black, and the stock supplied by the secondary extruder 11 and which preferably has a bright red color is marked R for red.

It is necessary to maintain a relatively high pressure in both extruders in order to secure the proper flow of the relatively stiff rubber stock. For example a pressure of about 1000 to 1500 lbs. per sq. inch, depending upon the properties of the rubber being extruded, should be maintained in the main extruder 10 and also in the secondary extruder 11. These high pressures generate considerable heat and it is therefore necessary to provide each extruder with a water jacket to carry off the excess heat so as to maintain a temperature within each extruder of from 210 to 270° F., depending upon the character of the stock used. Lower or higher temperatures however, can be used. The two extruders 10 and 11 are independently driven by variable speed driving means.

If the apparatus shown in the drawing is used, for example, to produce an inner tube for the so-called 600-16 tire or shoe, then the finished vulcanized inner tube should have an inside diameter across the annulus of about 16 inches and a cross-section diameter for the round tube of about 5 inches, so that this inner tube will be stretched about 25% when it is inserted in a tire and properly inflated. In order to produce the size inner tube just mentioned it is desirable to bend the hot doughy tube as it is extruded to an arc having an inside radius of about 14 inches.

The bending of this freshly extruded tube marked B, R to the desired arc is preferably secured by advancing the same as it is extruded along the curved path shown in Fig. 3 so that it will pass over the first of a number of tapered power driven rollers marked 13, one of which is shown in Fig. 3 and a number are shown in Fig. 1. These rollers 13 are shown as disposed in two rows, one row being disposed at the right hand side of the central longitudinal plane of the machine of Fig. 1 and the other row being disposed at the left-hand side of such plane. These tapered rollers 13 are all preferably driven at a surface speed somewhat in excess of the speed at which the tube B, R leaves the extruder 10 so that they will exert an appreciable pulling force upon the tube, but an excessive pulling force is prevented from being exerted upon the tube by the slippage which may occur between the surface of the rollers 13 and the extruded tube. In order that the tube just mentioned will retain its desired cylindrical shape as it leaves the extruder 10 and will bend to an arc of the desired radius shown in Fig. 3, it is important that an above atmosphere air pressure be maintained inside of the tube as it leaves the extruder. This is obtained by delivering compressed air into the inside of the tube by means to be described. As the freshly extruded tube passes over the first conical roller 13 it will flatten out to a substantial degree but not completely under the weight of the tube. This will be apparent from Fig. 3 wherein it will be seen that the tube B, R is shown as circular near the extruder and as elliptical at the roller 13. The internal air pressure maintained in the tube B, R controls the curvature of this tube and also prevents it from forming transverse ribs of corrugation at the inner curve wall of the arcuate tube. It also prevents the two walls of the hot freshly extruded tube from contacting and possibly adhering together. Furthermore the amount of inflation of the tube as it passes over the first conical roller 13 effects its movement lengthwise of its conical roller, and it is found that if the inflation of the tube is increased where it passes over the first conical roller 13 it will tend to travel towards the small end of this conical roller, whereas if the inflation decreases at this point it will tend to travel toward the large end of this roller.

The arcuate tube shown in Fig. 3 passes from the first conical roller 13 to a second conical roller 13 disposed at the opposite side of the machine shown in Fig. 1 so that it hangs downwardly between these two rollers in the form of a draped arc, and this advancing tube is draped back and forth from one conical roller 13 to another throughout the length of the machine shown in Fig. 1. As this tube advances along its path of travel from one conical roller to another its internal inflation gradually decreases, so that this tube will lie flat or approximately flat as it passes over the conical rollers 13 adjacent the discharge end of the machine.

As the tube B, R advances lengthwise the machine shown in Fig. 1 it preferably is cooled by spraying cold water upon the same from the spraying nozzles 14. The action is such that the arcuate tube gradually becomes set to the desired longitudinal curvature as it cools off, so that it will retain this arcuate curvature upon leaving the machine as shown in Fig. 1. It is desired to remove the water from the tube as it approaches the discharge end of the machine of Fig. 1. This is done by employing the pipe 15 arranged to direct blasts of air against the advancing tube to remove the water therefrom.

The various conical rollers 13 are supported by the side frames 16 and are driven by the chains 17 as more fully shown and described in the above mentioned Hinman patent. As this tube passes over the last conical roller 13 it is pressed against such roll by a floating upper roller 13'. It is then subjected to the severing action of a revolving cutter 18. This cutter is power driven and has the cutter blade 19 which presses the tube against the surface of the roller 13 with sufficient force to shear it and form the C-shaped inner tube blank C which drops under the influence of gravity on to the conveyor 20 which advances in the direction indicated by the arrow.

Having described how the main extruder 10 and secondary extruder 11 are associated with the machine which operates to impart an arcuate curvature to the advancing extruded tube so as to form inner tube blanks that have the shape of the letter C until the time they are formed into an inner tube, the preferred construction of these tubers 10 and 11 and the manner in which they cooperate to form the two-color or two-stock inner tube will now be described.

Now referring to Fig. 2, the auxiliary extruder 11 shown therein may have the construction of the usual rubber extruder except for the discharge end thereof, and as shown comprises the main extruder casing 21 in which is formed the usual extruder barrel 22 about which is provided the water cooling chamber 23. Within this barrel rotates the feed screw 24. To the extruder casing 21 is bolted the usual tuber head 25 having the water jacket 26, and to the outer end of this tuber head is bolted the face plate 27. The face plate is threaded as shown to receive the threaded collar 28 which is provided with an inner bore shaped to receive one end of the interconnector tube 12, above mentioned, and this tube is strongly welded to the collar 28 to withstand the high pressure built up inside of this extruder. The interconnector 12 preferably tapers so that it converges in the direction in which the rubber compound passes therethrough, and its discharge end projects into a recess in a clamping block 29 and is welded to this block. The rubber stock which is herein designated by R is fed into the secondary extruder 11, at a point not shown, in the form of a uniform strip, and is forced in the direction indicated by the arrow by the screw 24 to the main extruder 10, which will now be described in detail.

The main extruder designated in its entirety by 10 preferably has the construction best shown in Figs. 2 and 4 and comprises the main tuber frame 30 having the tuber barrel 30' provided with a water jacket 30". To the tuber 30 is rigidly secured by the bolts 31 the tuber head 32 having the water jacket 33. This tuber head is internally threaded as shown to receive a threaded sleeve forming portion of the one arm spider ring 34. This ring is likewise internally threaded to receive the die locking ring 35. The one arm spider ring 34 is provided with the inwardly extending spider 36 which is best shown in Fig. 5. This spider serves to support the longitudinally extending mandrel 37. This mandrel is threaded at its inner end and is screwed tightly into the spider 36 as indicated at 38. The circular flange upon the mandrel 37 abuts against one face of the spider 36, and the opposite face of this spider has protruding therefrom the bullet-shape mandrel plug 39. The main purpose of the mandrel 37 is to support the plug 40 concentrically with the longitudinal axis of the extruder, and this plug is maintained in the desired position lengthwise of the mandrels 37 by the nut 40' threaded upon the outer end of this mandrel.

The one arm spider ring 34 serves to support a tuber die 41 so that it may be moved slightly in a plane at right angles to the axis of the mandrel 37. To the outer face of the tuber die 41 is secured by means of the screws 42 the tuber die ring 43, and in this ring is formed the extruding throat 44 with which the plug 40 cooperates to form an extruded tube of any desired wall thickness. Since it usually is desirable to form an inner tube having the thickness of its wall in the tread area slightly different from the thickness of its wall in the rim area, it is important to provide means whereby the elements 41 and 43 may be adjusted relatively to the mandrel 37. To this end the one arm spider ring 34 is provided with the adjusting bolts 45, which are preferably spaced 90° apart around the axis of the extruder as will be apparent from Fig. 2. The inner end of these bolts press against a threaded ring 46 which is mounted upon the threaded inner end portion of the tubular die 41. The clearance space provided between the inner wall of the die locking ring 35 and the outer wall of the tuber die 41 permits the die portions 41 and 43 to be adjusted laterally an appreciable amount relatively to the mandrel 37, to thereby vary the thickness of one side of the tube being extruded relative to the thickness of an opposite side of such tube, as the tube stock B is forced through the narrow annular passage lying between the throat 44 and outer surface of the plug 40.

As above stated it is important to maintain an above atmosphere pressure within the tube as it leaves the extruder. This is accomplished in the construction shown by making the mandrel 37 hollow and mounting in the bore of this mandrel a small pipe 47 which is supplied with air under pressure through the air passages 48 that receive air under pressure from the pipe 49. The compressed air supplied through the pipe connections just mentioned carries with it a predetermined amount of talc or other anti-tack material which is blown upon the inner walls of the freshly extruded tube to prevent one wall from sticking to another. This compressed air and talc as discharged from the end of the pipe 47 is directed lengthwise of the curved extruded tube by the elbow 50. In order to accurately control the pressure of the air just mentioned within the freshly extruded tube, it is found desirable to supply the air to the pipe 47 at a constant relatively high pressure, and to control the pressure within the extruded tube by creating a vacuum within the space between the inner bore of the mandrel 37 and outer surface of the pipe 47. To this end the air passages 51 are formed in the spider ring and are connected to a pipe 52 which in turn is connected to vacuum means. This pipe 52 is provided with a valve, not shown, but which can be opened and closed to vary the amount of air being exhausted from the inside of the freshly extruded rubber tube. In this way the air pressure within such tube can be accurately controlled and a constant amount of talc is discharged inside of the tube.

The main extruder 10 having the construction just described and which is best shown in Fig. 4, operates, for the most part in a well known manner to produce an extruded rubber tube. The stock to be extruded is fed to this extruder, at a point not shown, by delivering a strip of such stock of uniform size to the extruder to be forced axially within the extruder and through the extruding die by the revolving screw 53.

An important feature of the present invention resides in the construction whereby the stock supplied by the secondary extruder 11 is supplied to the main extruder 10 through an opening in a side wall thereof to enter the high pressure chamber, so that this stock from the secondary extruder will be forced into contact with the tube being produced by the primary extruder. For an understanding of how this is accomplished see Figs. 6 to 11 inclusive. The block 29 secured to the discharge end of the interconnector 12 is rigidly secured by bolts 54 to flattened surfaces formed at the lower side of a tuber die ring 43 and the tuber die 41. The tuber die 41 is provided adjacent its outer cylindrical surface with the centering rim 55 in which fits a correspondingly shaped annular rim 56 formed on the inner face of the tuber die ring 43 and adapted to center one ring accurately relatively to the other. The two rings 41 and 43 when tightly bolted together by the bolts 42 abut one face against the other in the upper curved portion of the die, but the lower curved portion of these faces of the rings 41 and 43 are cut away in the form of arcuate grooves adapted to receive the stock from the secondary extruder, see the arcuate groove 57 in Fig. 6 and the arcuate groove 58 in Fig. 7. These arcuate grooves decrease in depth from their central portion toward each end. Between these arcuate grooves and the inner bore of the rings 41 and 43 are provided the co-operating arcuate ribs 59 and 60. The face of the rib 60 is ground off a few hundredths of an inch as shown in Figs. 8, 10 and 11 to provide a narrow arcuate passage through which the stock supplied by the interconnector 12 can pass into the main extruder 10 as shown in Fig. 4.

Since the rubber compound supplied to each of the extruders is relatively stiff, it is difficult to get the compounds supplied by the secondary extruder 11 to flow lengthwise of the arcuate channels 57 and 58 and pass uniformly into the bore of the main extruder through the annular passage provided between the ribs 59 and 60. To overcome this difficulty it is found desirable to provide baffles 61 and 62 opposite the discharge end of the interconnector 12 and within enlarged portions of the arcuate passages 57 and 58. These baffles are curved as shown in Figs. 6 and 7 and the baffle 61 is secured by screws within the channel 57, whereas the baffle 62 is secured by screws within the channel 58. The baffle 61 preferably has one edge thereof ground away as shown in Fig. 9, so that when the baffles are in their operative position a narrow slot 63 will be formed between them through which some rubber stock may pass, and other stock will flow around the ends of these baffles.

It is considered desirable to have the red portion of the inner tube in the tread area extend through an arc of a little over 200°, as shown in Fig. 13. It is found difficult to force the stock to travel through an arc of more than 180° within the passages 57 and 58. In order to overcome this difficulty and secure a uniform flow of the stock through the slot formed between the arcuated ribs 59 and 60 throughout an arc of over 200°, it is desirable to increase the width of this slit near each end of the same. This is accomplished by grinding away the face of the curved rib 60, as shown in Fig. 8 so as to increase the depth of the slot near the ends thereof as indicated at 64. The square shoulders formed at the ends of the slots 64 define accurately the width of the strip of red stock R. It is found that by using the baffles 61 and 62 constructed as above described and by grinding away the face of the rib 60 as just described, the rubber stock can be forced through the narrow slot leading into the main extruder so as to form a thin sheet of uniform thickness and less than two hundredths of an inch thick and which is extruded throughout an arc of over 200°. The finished inner tube for a 600–16 tire preferably has a wall thickness of between .06" and .07" and the thickness of the red layer R is about .016".

It will be noted from Fig. 4 that the red stock is forced into the main extruder against the stream of the advancing black stock at a point that is some distance to the left of the annular throat 44 so that this red stock and black stock are subjected to the same high pressure within the main extruder. This causes the thin film of red stock to be pressed against the black stock under such high pressure that they form one integral sheet in which the red stock appears as a clearly defined strip extending lengthwise of the black tube, and it is bonded so securely thereto that they cannot be separated.

It will be seen from the foregoing that as a result of the present invention it is practical to make an inner tube which is formed for the most part of a stock that is highly impervious to air, such as butyl rubber, so that the inner tube will need to be inflated when in use only at infrequent intervals, and this tube will have integrally secured thereto over a large or major area thereof a thin film of a different colored stock, or different type stock as desired. This film may be provided to impart to the inner tube contrasting colors, or it may impart to the tube in the tread area thereof elastic properties that are not possessed by the rest of the tube. If desired, the strip R may impart to the tread area of the tube a softer and more flexible surface than is possessed by the other portion of the tube, or other desired properties may be imparted to this thin film R which cannot be readily imparted to the main portion of the tube indicated by B. In practice it is found not desirable to add carbon to the red stock R since carbon will darken the stock, therefore the red stock is in most cases softer and more plastic than the black stock. In case the inner tube is exposed to extremely low temperatures the softer crown stock R may retain its elastic properties better than the black stock and thereby reduce the tendency of the inner tube to buckle in the tread portion of the tire when such tire is in use at temperatures so low that the butyl black stock becomes substantially nonelastic.

The apparatus described serves to produce the two-tone or two-color tube B, R as a continuos tube and to bend the same in the form of an arc and set it to this arcuate curvature, to thereby form the inner tube sections C shown in Fig. 1. These sections C are preferably so cut that the arcuate section extends through an angle of from about 180° to 230°. These arcuate sections C are then formed into inner tubes by securing to such tube section near one end thereof the usual air valve 65, see Fig. 12. Then the ends of the blank C are butt welded together at the line 66 of Fig. 12. The unvulcanized inner tube is then placed upon an annular form and inflated to its approximately normal size. It is then placed in a vulcanizing mold, where it is subjected to a higher inflating pressure, and is vulcanized in such mold in the usual manner. This completes the operation of forming the two-color or two-stock inner tube contemplated by the present invention and which is shown in side view in Fig. 12 and in section in Fig. 13.

The stock used in either the portion R or the portion B of the inner tube may be formed of various suitable compositions of natural or synthetic rubber. By synthetic rubber I refer to those modified butadiene-1, 3-derived rubber materials which lie within the class of neoprene (polychloroprene), Buna S (rubber copolymer of butadiene-1, 3 and styrene), Buna N (rubbery copolymer of butadiene-1, 3 and acrylonitrile), butyl (rubbery copolymer of a major proportion of a monoolefine, e. g., isobutylene, with a minor proportion of a conjugated 1, 3-diene, e. g., isoprene). In addition to the foregoing compositions, I may employ other suitable elastic materials.

Having thus described my invention what I claim and desire to protect by Letters Patent is:

Apparatus for manufacturing multiple stock seamless tubing comprising, a die head provided with a compression chamber and an annular discharge orifice, an extruder connected to said die head for forcing stock therethrough to form a continuous tubular body, the wall of said compression chamber having a circumferentially extending comparatively narrow slot formed therein, the extent of said slot being in excess of 180° of the circumference of said compression chamber and of increased width at its extremities, a second extruder for forcing a second stock through said slot into said compression chamber, means providing a passageway interconnecting said second extruder and said slot through which said second stock can pass from said second extruder to said slot, and means positioned in said passageway for distributing said second stock along the full length of said slot so that said second stock is introduced through said slot into said compression chamber as a comparatively thin sheet of substantially uniform thickness and of a width substantially equal to the length of said slot and will be united with said first mentioned stock by the pressure exerted thereon in the compression chamber as the stocks move to the discharge orifice of the die head, whereby the completed tube is extruded with the second stock embedded in the outer surface thereof and integrally bonded thereto.

References Cited in the file of this patent

UNITED STATES PATENTS

| | | |
|---|---|---|
| 1,428,381 | Lower | Sept. 5, 1922 |
| 1,492,218 | Prince | Apr. 29, 1924 |
| 1,564,397 | Armstrong | Dec. 8, 1925 |
| 1,933,212 | Gora | Oct. 31, 1933 |
| 2,017,806 | Riggs | Oct. 15, 1935 |
| 2,099,514 | Eberhard | Nov. 16, 1937 |
| 2,138,378 | Johnson | Nov. 29, 1938 |
| 2,216,832 | Royle | Oct. 8, 1940 |
| 2,423,147 | Hinman | July 1, 1947 |
| 2,444,831 | Kilborn | July 6, 1948 |
| 2,521,123 | Lawrence | Sept. 5, 1950 |

FOREIGN PATENTS

| | | |
|---|---|---|
| 401,529 | Great Britain | Jan. 24, 1933 |